US007392475B1

(12) United States Patent
Leban et al.

(10) Patent No.: US 7,392,475 B1
(45) Date of Patent: Jun. 24, 2008

(54) METHOD AND SYSTEM FOR AUTOMATIC INSERTION OF CONTEXT INFORMATION INTO AN APPLICATION PROGRAM MODULE

(75) Inventors: Roy Leban, Redmond, WA (US); Timothy D. Sellers, Bellevue, WA (US); Stephen Matlock, North Bend, WA (US); Shaheeda Parveen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 819 days.

(21) Appl. No.: 10/444,585

(22) Filed: May 23, 2003

(51) Int. Cl.
*G06F 17/00* (2006.01)
(52) U.S. Cl. .................. 715/255; 715/272; 715/273; 715/776
(58) Field of Classification Search .............. 715/523, 715/526, 229, 255, 272, 273, 776; 719/329
See application file for complete search history.

(56) References Cited

U.S. PATENT DOCUMENTS

| 6,178,431 | B1 * | 1/2001 | Douglas ............... 715/512 |
| 6,199,082 | B1 * | 3/2001 | Ferrel et al. ........... 715/205 |
| 6,253,193 | B1 * | 6/2001 | Ginter et al. ........... 705/57 |
| 6,389,434 | B1 * | 5/2002 | Rivette et al. .......... 715/209 |
| 6,681,371 | B1 * | 1/2004 | Devanbu ............... 715/209 |
| 6,928,425 | B2 * | 8/2005 | Grefenstette et al. ...... 707/2 |
| 2003/0028561 | A1 * | 2/2003 | Gounares et al. ........ 707/513 |
| 2003/0072562 | A1 * | 4/2003 | Vau et al. .............. 386/96 |
| 2003/0101235 | A1 * | 5/2003 | Zhang ................. 709/218 |
| 2003/0196164 | A1 * | 10/2003 | Gupta et al. ........... 715/500.1 |
| 2004/0122898 | A1 * | 6/2004 | Srinivasa .............. 709/205 |
| 2008/0034281 | A1 * | 2/2008 | Handsaker et al. ....... 715/219 |

OTHER PUBLICATIONS

Simon, Jinjer, Excel 2000 in a Nutshell, Aug. 2000, O'Reilly, Menu Reference:Data.*
Microsoft Excel 2000, Screenshots, (C) 1999.*

* cited by examiner

*Primary Examiner*—Stephen Hong
*Assistant Examiner*—Adam M Queler
(74) *Attorney, Agent, or Firm*—Perkins Coie LLP

(57) ABSTRACT

Context information surrounding an application program can be inserted into an electronic document in order to increase accuracy and efficiency in note taking. For example, in a meeting scenario where a slide presentation is being displayed, the present invention can automatically insert information relating to the slide presentation into an application program such as a document editing module. Specifically, in this example, the information relating to the slide information can be inserted into the document editing module in one of four different formats: (1) as editable text derived from each slide; (2) an editable image for each slide; (3) a thumbnail image for each slide; (4) a hypertext link to each slide; and (5) any combination thereof.

14 Claims, 12 Drawing Sheets

METHOD AND SYSTEM FOR AUTOMATIC INSERTION OF CONTEXT INFORMATION INTO AN APPLICATION PROGRAM MODULE

TECHNICAL FIELD

The present invention relates to creating electronic documents and more specifically relates to inserting context information into an application program that may originate from another application program or a device.

BACKGROUND OF THE INVENTION

One of the simplest methods of recording and communicating information is the traditional method of writing information down on a piece of paper with a writing instrument such as a pen. Writing information by hand on a piece of paper is inexpensive and can be done quickly and easily with little preparation. The traditional method is also flexible in that a writer can generally write in any format anywhere on the page.

However, one of the limitations of handwritten work is that the author of such work often needs to record information that does not require significant thought but does require effort. For example, when present at a meeting, an author of notes will often write down background or context information relating to the meeting. Specifically, the author will often record the time, date, location, title of the meeting, and meeting attendees. Sometimes, the author may even re-write the agenda scheduled for the meeting. As another example of context information, when an author of notes receives a phone call, he or she will often record the time, date, subject of the call, and the identity of the caller.

The aforementioned exemplary context information share a common trait: Because the context information does not require significant thought but does require effort, the author usually does not record this information especially when the author is pressed for time and efficiency. In some situations, an author will skip recording context information in order to concentrate on information that does require critical thinking. When this context information is not recorded, the notes taken by an author may not make sense to a person reading them later. Also, it may be difficult for the author to locate a set of notes when notes are taken in a series with other sets of notes.

Advances have been made to help an author organize and preserve handwritten notes electronically. For example, conventional electronic tablets have been made that can record handwriting. Such electronic tablets typically comprise a screen and a handheld device that is similar to a pen (also referred to as a stylus). A user can manipulate the pen to write on the electronic tablet in a manner similar to the use of traditional pen and paper. The electronic tablet can "read" the strokes of the user's handwriting with the handheld device and render the handwriting in electronic form on the tablet's screen and/or the computer's display as "electronic ink".

This electronic tablet approach can be employed in a variety of ways including on a personal computer and on a handheld computing device. The electronic tablet can be useful for taking notes when the tablet supports a document editing program. Instead of using an electronic tablet to record handwritten notes, a keyboard can be used to generate typewritten notes that can be recorded in a document editing program.

While the document editing program can be used to preserve handwritten notes or typewritten notes (or a combination thereof), such programs suffer the same draw backs relative to the traditional pen and paper approach with respect to context information. Conventional document editing programs do not assist the author to record context information such as the time, date, location, title of a meeting, and attendees present at a meeting.

Accordingly, there is a need in the art for a method and system for automatically inserting context information into an application program such that an author can concentrate on preserving information that requires more critical thinking and that cannot be accurately recorded by a machine. Another need exists in the art for a method and system that inserts context information into an application program and permits the context information to be formatted or presented in a variety of ways.

SUMMARY OF THE INVENTION

The present invention can comprise a method and system automatically inserting context information into an application program. In other words, the present invention can monitor context information surrounding an application program and can insert this information directly into the application program in order to increase accuracy and efficiency during note taking.

For example, in a meeting scenario where a slide presentation is being displayed, the present invention can automatically insert information relating to the slide presentation into an application program such as a document editing module. Specifically, in this example, the information relating to the slide information can be inserted into the document editing module in one of four different formats: (1) as editable text derived from each slide; (2) an editable image for each slide; (3) a thumbnail image for each slide; (4) a hypertext link to each slide; and (5) any combination thereof.

The present invention is not limited inserting context information relating to slide presentation scenarios. Other scenarios or events which can comprise context information that can be inserted into a document editing module include monitoring surfing on the Internet, placing or receiving telephone calls, viewing video programs, listening to music, receiving a faxes, monitoring a controlled accessed facility/room, and other types of scenarios.

According to one exemplary aspect of the present invention, the system can comprise a controller that monitors other application programs that may exist on single computer. The controller may comprise a separate program module that can poll or pull information from the application programs as events occur. The controller can monitor many different types of application programs. Some application programs can include, but are not limited to, slide presentation programs, web browsing programs, spreadsheet programs, word processing programs, e-mail programs, scheduling programs, and calendar programs, just to name a few. Other application programs are not beyond the scope and spirit of the present invention.

According to one exemplary scenario, the controller of the present invention can monitor an internet browser. In this way, if notes are being created about a particular web page in a document editing module, the controller can automatically insert a hypertext link or an editable image of the web page being browsed by the internet browser. In this way, the uniform resource locater (URL) or internet address will be automatically recorded into the document editing module.

According to another exemplary scenario, a slave slide presentation application program and the controller may reside on one platform while a master slide presentation program may reside on another platform. The slave slide presentation program may be operatively linked to the master slide presentation program.

When the slave slide presentation program receives new information from the master slide presentation program, the controller can detect this new information by monitoring the slave slide presentation program. Alternatively, instead of the controller polling or pulling information from the slave slide presentation program, the slave slide presentation program can push information on to the controller. The controller can insert this new information into a document editing module where a user can be taking notes. The new information can be inserted into the document according to a format previously selected by a user. The user can further select different display or storage formats for the information at his or her option.

As another non-limiting example, when an e-mail application program receives a message that is related to a document that is being edited within a document editing module, the controller can feed this e-mail information to the document editing module. The e-mail information can be inserted into the document according a format previously selected by a user. The user can further select different formats for the e-mail information at his or her option. In this way, notes of a user can be associated with context information as the context information is being generated.

According to another exemplary aspect of the present invention, the controller can monitor an application program that resides on a different platform relative to the platform of the controller. The controller can use one or more application programming interfaces (APIs) to communicate with application programs residing on a different platform or with application programs present on the same platform, where a platform can include a single machine or a class of machines.

According to a further aspect of the present invention, a first controller may support or comprise a user interface. The first controller can communicate with several other different second controllers that may reside on platforms different from the first controller. In this way, the first controller can communicate context information present in the user interface directly with other second controllers. For example, in an exemplary meeting scenario, a meeting agenda can be entered into the user interface of the first controller. The first controller can communicate this meeting agenda to the second controllers residing on different platforms. The second controllers can communicate this meeting agenda to their respective document editing programs.

The first controller can also monitor the presence of the other second controllers and update context information based on the detection or presence of another second controller. For example, as a new second controller joins a meeting, the first controller can communicate to other existing second controllers of the meeting that the new second controller has joined the meeting. In other words, when a new person joins a meeting, the first controller can update an attendee list so that each controller will now have this information that the new person has joined the meeting.

According to another aspect of the present invention, the controller can monitor context events originating from things other than application programs. For example, the controller can be operatively linked to a telephone such that when a call is received, the caller identification information that can comprise a name and number of caller can be automatically inserted into a document editing module that is linked to the controller. Alternatively, as noted above, the controller can monitor an application program that is designed specifically to monitor incoming and outgoing phone calls. Also, the controller can be operatively linked to other devices such as, but not limited to, a television, a fax machine, and other devices that may produce context information that can be inserted into an document editing module.

DETAILED DESCRIPTION OF EXEMPLARY EMBODIMENTS

A method and system for automatically inserting context information into an application program can monitor event information generated by a variety of other program modules and devices. According to one exemplary embodiment, context information may be generated by application programs such as slide presentation programs, web browsing programs, spreadsheet programs, word processing programs, e-mail programs, scheduling programs, and calendar programs, just to name a few. Devices monitored for context information can include telephones, televisions, fax machines, and other devices.

Exemplary Operating Environment

Figure 1:
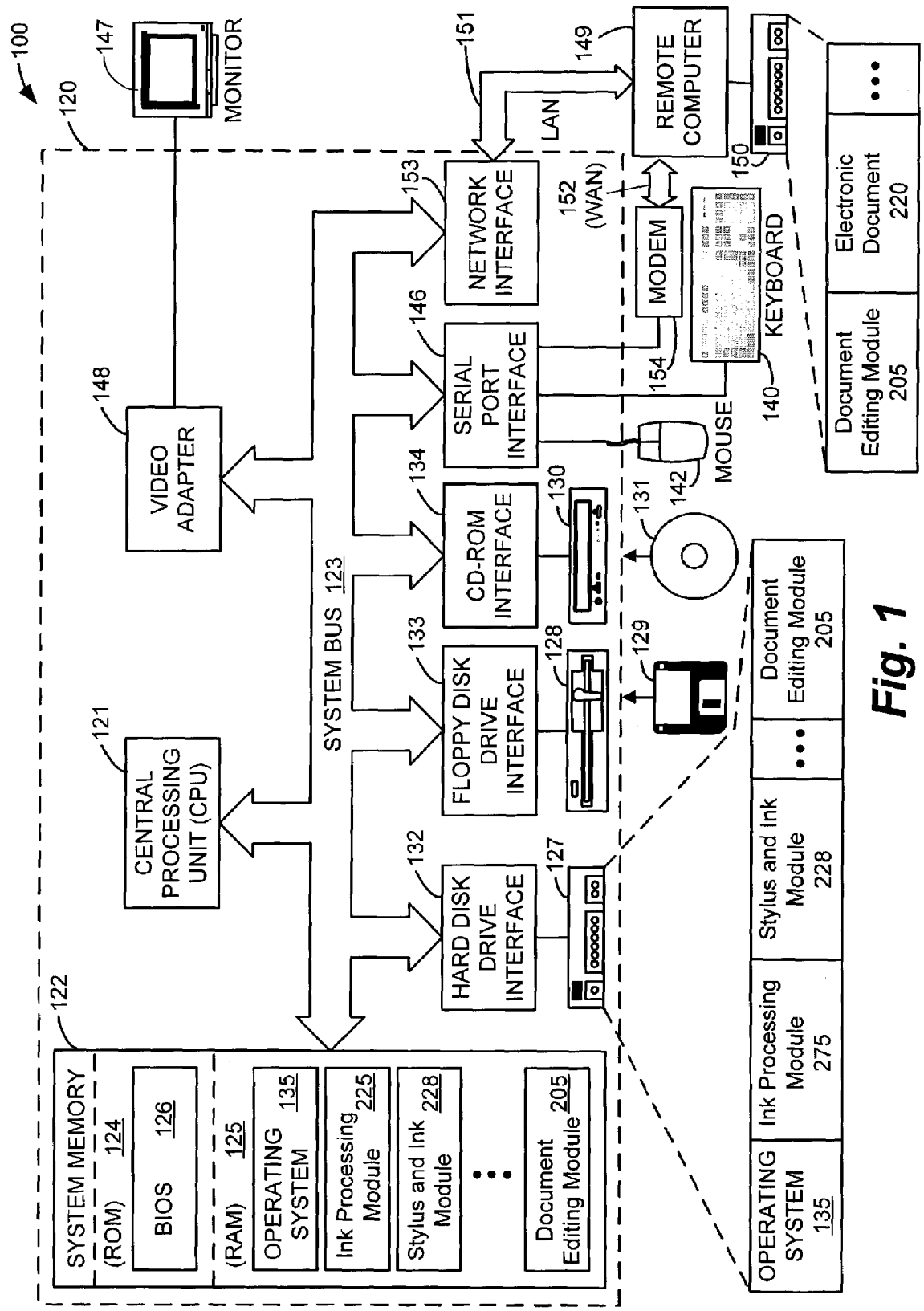
FIG. 1 is a block diagram illustrating an exemplary operating environment for implementation of various embodiments of the present invention.

Exemplary embodiments of the present invention will hereinafter be described with reference to the drawings, in which like numerals represent like elements throughout the several figures. FIG. 1 illustrates an exemplary operating environment for implementation of the present invention.

The exemplary operating environment includes a general-purpose computing device in the form of a conventional personal computer 120. Generally, the personal computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes a read-only memory (ROM) 124 and a random access memory (RAM) 125. A basic input/output system (BIOS) 126, containing the basic routines that help to transfer information between elements within personal computer 120, such as during start-up, is stored in ROM 124.

Personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. Hard disk drive 127, magnetic disk drive 128, and optical disk drive 130 are connected to system bus 123 by a hard disk drive interface 132, a magnetic disk drive interface 133, and an optical disk drive interface 134, respectively.

Although the exemplary environment described herein employs hard disk 127, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 120.

A number of program modules may be stored on hard disk 127, magnetic disk 129, optical disk 131, ROM 124, or RAM 125, including an operating system 135, an ink processing module 225, a stylus and ink module 228, and an electronic document editing module 205. Program modules include routines, sub-routines, programs, objects, components, data structures, etc., which perform particular tasks or implement particular abstract data types. Aspects of the present invention may be implemented in the form of a ink processing module 225 that can operate in concert with a stylus and ink module 22.

A user may enter commands and information into personal computer 120 through input devices, such as a keyboard 140 and a pointing device 142. Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 122 through a serial port interface 146 that is coupled to the system bus 123, but may be connected by other interfaces, such as a parallel port, game port, a universal serial bus (USB), or the like. A display device 147 may also be connected to system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers 149. Remote computer 149 may be another personal computer, a server, a client, a router, a network PC, a peer device, or other common network node. While a remote computer 149 typically includes many or all of the elements described above relative to the personal computer 120, only a memory storage device 150 has been illustrated in the Figure. The logical connections depicted in the Figure include a local area network (LAN) 151 and a wide area network (WAN) 152. Such networking environments are commonplace in offices, enterprise-wide computer networks, intranets, and the Internet.

When used in a LAN networking environment, the personal computer 120 is often connected to the local area network 151 through a network interface or adapter 153. When used in a WAN networking environment, the personal computer 120 typically includes a modem 154 or other means for establishing communications over WAN 152, such as the Internet. Modem 154, which may be internal or external, is connected to system bus 123 via serial port interface 146. In a networked environment, program modules depicted relative to personal computer 120, or portions thereof, may be stored in the remote memory storage device 150. It will be appreciated that the network connections shown are exemplary and other means of establishing a communications link between the computers may be used.

Moreover, those skilled in the art will appreciate that the present invention may be implemented in other computer system configurations, including hand-held devices, multiprocessor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
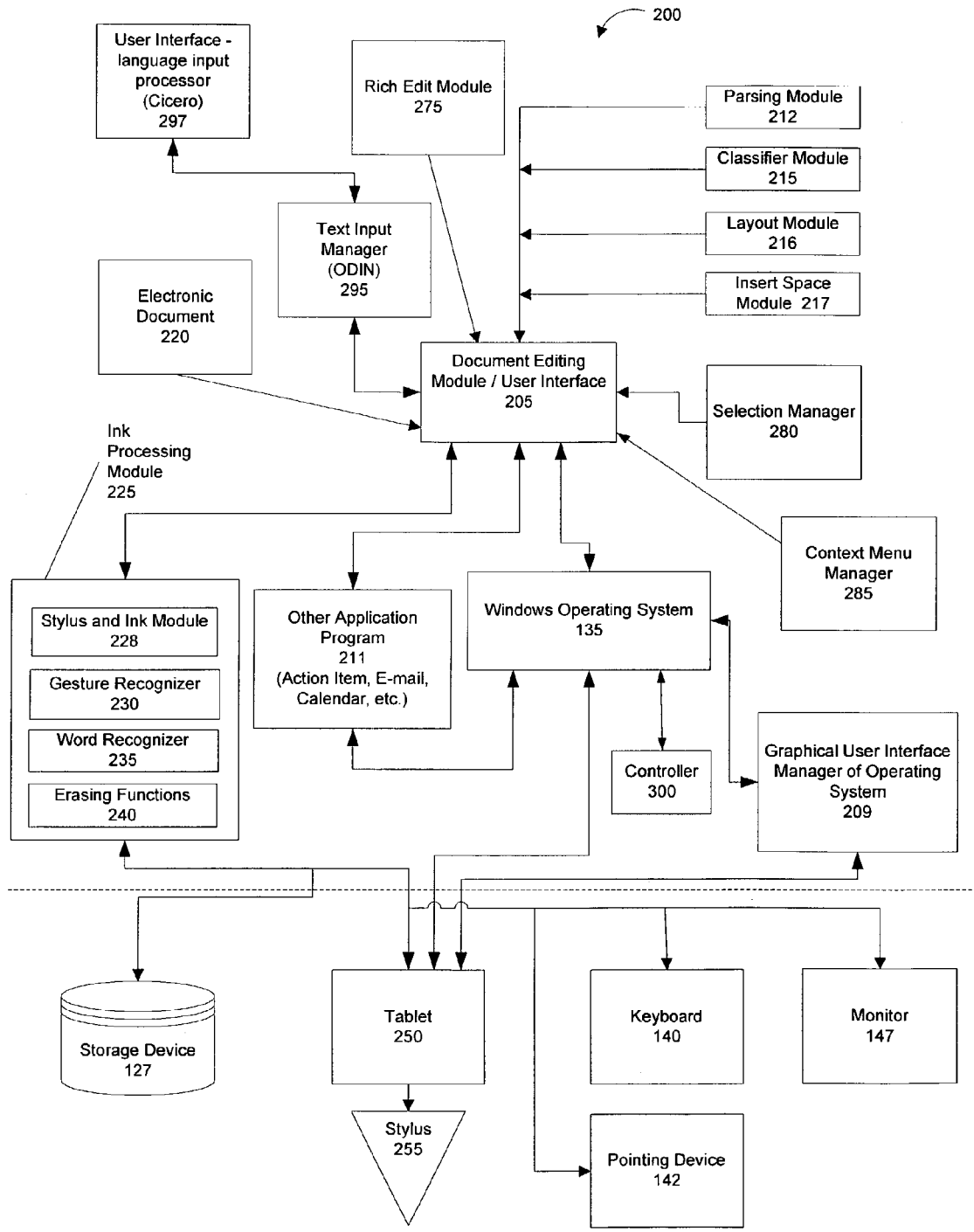
FIG. 2 is a block diagram depicting the primary functional components of an exemplary free-form document editor and related input devices.

Referring to FIG. 2, an exemplary architecture 200 is illustrated for editing electronic ink in accordance with an embodiment of the present invention. FIG. 2 shows typical hardware and software components used in operating the invention from a functional perspective. Conventional input devices are represented by the keyboard 140 and the pointing device (mouse) 142. A user can enter commands and information into the computer 120 using the input devices. Other input devices (not shown) may include a microphone, joystick, game pad, satellite dish, and scanner.

A conventional output device, such as monitor 147, is used to display information from the computer 120. Other output devices (not shown) can include a printer or speaker. Other hardware components shown in FIG. 2 include an electronic tablet 250 and an accompanying stylus 255. The tablet 250 and stylus 255 are used to input handwriting strokes which are converted to collections of data that can be represented as electronic ink. The electronic ink may be incorporated into an electronic document 220 supported by the document editing module 205 and may be displayed on either the electronic tablet 250, the monitor 270, or both.

Although the electronic tablet 250 and the monitor 147 are illustrated as being distinct, in the preferred embodiment they are either coupled or form a single component. The joint tablet/monitor component has the ability to display information and receive input from the stylus 255. Also shown among the hardware components is a conventional electronic storage device such as a hard drive 127 or RAM 125.

In the representative architecture 200, all of the hardware components are coupled to an ink processing software module 225. It should be understood by those skilled in the art that FIG. 2 is merely representative and that in practice the hardware components typically are coupled to the elements shown in FIG. 1. The ink processing module 225 is operable for receiving data from the electronic tablet 250 and/or the stylus 255 and rendering that data as electronic ink. In the preferred and exemplary embodiment, the ink processing module 225 is a collection of software modules that perform different tasks for rendering handwriting strokes as electronic ink.

For example, the stylus and ink module 228 can receive data describing the positions and angles of the stylus for a series of handwriting strokes. The stylus and ink module 228 can interpret the data for rendering electronic ink. Other software modules, such as a gesture recognizer 230 and word recognizer 235 can be designed to identify certain handwriting strokes and assign them a particular significance. For example, certain gestures such as a cross-out may be recognized and associated with other editing processes. The ink processing module 225 can also include an erasing functions module 240 for removing electronic ink that has been previously rendered.

Although ink processing modules are known in the art and necessary for an electronic tablet to function, what is needed is a document editing module 205, such as the one shown in FIG. 2, that enhances the performance of an electronic tablet. Specifically, document editing module 205 facilitates the manipulation of electronic ink so that a user can create and manipulate an electronic document 220 with greater ease and sophistication.

The windows operating system 135 can comprise a graphical user interface (GUI) manager 209. The document editing module 205 can be operatively linked to other application programs 211, such as action item programs, e-mail programs, calendar programs and the like. The document editing module 205 can use application programming interfaces (APIs) (not shown) to form this link.

A controller 300, as will be discussed below, can comprise a program module that monitors activity or events generated by the other application program 211. The controller 300 can monitor the activity or events by polling or pulling from the other application program 211. Alternatively, the controller can monitor activity by receiving information from the other application program 211 that is pushed by other application program onto the controller 300. Further details of the controller 300 will be discussed below with respect to FIGS. 3, 4, and 6.

Meanwhile, the document editing module 205 may further comprise a collection of software modules for controlling and manipulating electronic ink rendered on the monitor 147. For example, a parsing module 210 can be used to identify handwriting strokes that are selected by the user for editing. Selected strokes may by highlighted or shaded to assist the user in identifying which strokes are to be edited. A classifier module 215 can identify certain handwriting strokes as being part of a word or drawing. Software modules such as the layout module 216 and the insert space module 217 can be designed to control how electronic ink is rendered and moved. Other modules can include a selection manager 280, a context menu manager 285, a text input manager 295, and a user interface language input processor 297.

The selection manager 280 can monitor how converted text or electronic ink is selected for editing by the user. The context menu manager 285 can monitor the selection of a list of alternate words that can be displayed when a user edits a word in converted text. The text input manager 295 can operate as an interface for a user interface language input processor 297 that uses language rules to assist in the recognition of words through context.

The modules shown in FIG. 2 are representative and those skilled in the art should understand that other modules may also be part of or coupled to the document editing module 205. For example, the document editing module 205 may also work with a rich edit module 275 that provides added functionality such as monitoring and controlling the selection of text and word wrapping.

The present invention includes multiple computer programs which embodies the functions described herein and illustrated in the exemplary display screens and the appended flow chart. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the exemplary display screens and flow charts and associated description in the application text, for example.

Therefore, disclosure of a particular set of program code instructions is not considered necessary for an adequate understanding how to make and use the invention. The inventive functionality of the claimed computer program will be explained in more detail in the following description in conjunction with the remaining Figures illustrating the functions and program flow.

Exemplary Architecture Overview

Figure 3:
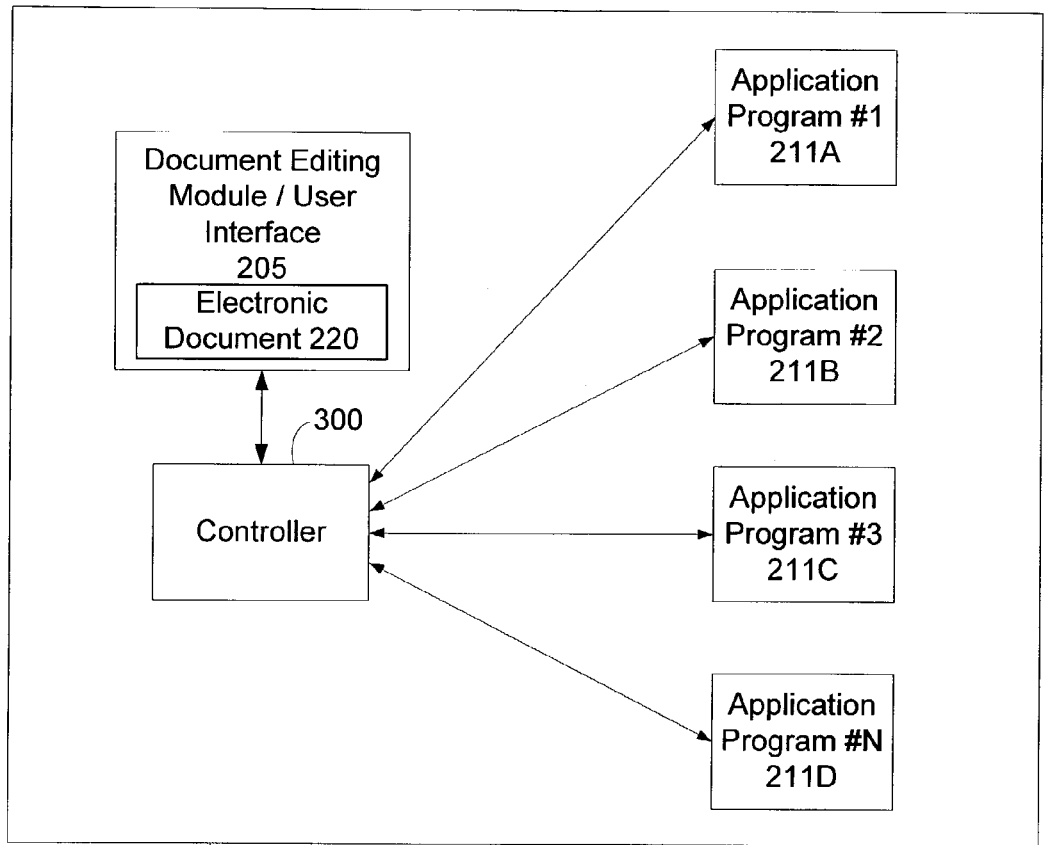
FIG. 3 is a block diagram illustrating a controller and application programs present on a single platform according to one exemplary embodiment of the present invention.

Referring now to FIG. 3, this Figure is a block diagram illustrating a controller 300 and application programs 211 present on a platform 305 according to one exemplary embodiment of the present invention. The platform 305 can comprise a single computer. The controller 300 can comprise a program module that can communicate directly with application programs 211 or via application programming interfaces (APIs—not shown).

While the controller 300 is illustrated and described as a separate program module, one of ordinary skill in the art recognizes that the functionality of this module could be incorporated into the document editing module 205 or each of the application programs 211 or a combination thereof. The controller 300 can monitor activity or events generated by each application program. When an event is generated, the controller 305 can forward information about the event to the document editing module 205 that supports an electronic document 220. For example, suppose application program #1-211A comprises an internet browser. The controller 300 can monitor activity or events produced by the internet browser 211.

When an event is created, such as surfing to a particular web page on the internet, the controller 300 can send this context information to the document editing module 205. The document editing module 205 can then determine how to format this context information. For example, the document editing module 205 could insert this context information into the electronic document 220 in any one or a combination of formats such as a hypertext link, an editable image, a small image (i.e.—a thumbnail image), and as editable text data. Further details of the exemplary formats will be discussed below with respect to FIGS. 5 and 7.

Figure 4:
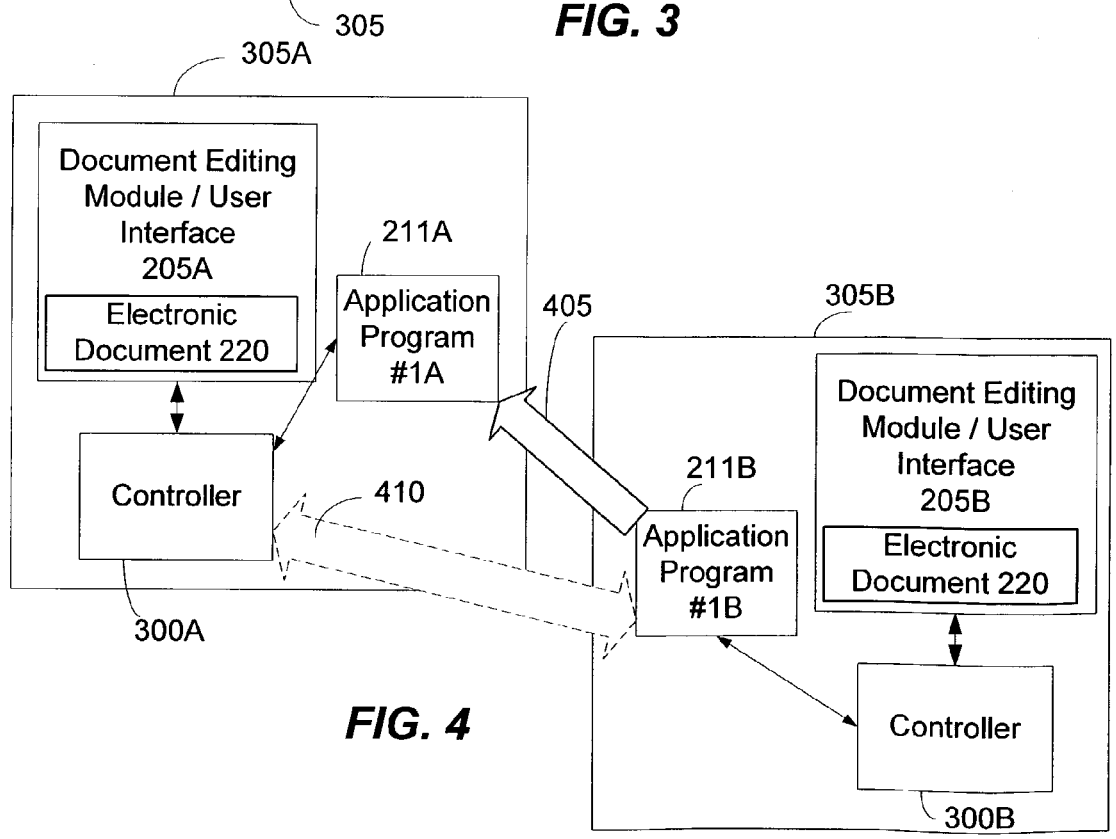
FIG. 4 is another block diagram illustrating multiple controllers and application programs present on a different platforms according to one exemplary embodiment of the present invention.

Referring now to FIG. 4, since this Figure is similar to FIG. 3, only the differences between these two figures will be discussed below. FIG. 4 is another block diagram illustrating multiple controllers 205A, 205B and application programs 211A, 211B present on a different platforms 305A, 305B according to one exemplary embodiment of the present invention. In this exemplary embodiment, a first application program 211A on a first platform 305A can comprise a slave application program that is operatively linked to a master application program 211B that resides on a second platform 305B. As illustrated with a first arrow 405, the slave application program 211A can receive commands or changes from the master application program 211B.

As a more specific example, the slave application program 211A can comprise a slave slide presentation application program that is operatively linked to the master application program 211B that can comprise a master slide presentation program. When the slave slide presentation program 211A receives new context information from the master slide presentation program 211B, the controller 300 can detect this new context information by monitoring the slave slide presentation program 211A.

Alternatively, instead of the controller 300 polling or pulling information from the slave slide presentation program 211A, the slave slide presentation program 211A can push context information on to the controller. The controller 300 can insert this new context information into an electronic document 220 (not shown) supported by the document editing module 205A where a user can be taking notes. The new context information can be inserted into the document 220 according to a format previously selected by a user. The user can further select different display or storage formats for the information at his or her option.

As a further alternative exemplary embodiment, the controller 300A of the first platform 305A can be operatively linked to the master slide presentation program 211B residing on the second platform 305B as indicated with the second dashed arrow 410. However, this is a less preferred embodiment as of the time of this written description, as this embodiment may require more complex APIs relative to the embodiment in which the controller 300A merely monitors the slave slide presentation program 211A.

Figure 5A:
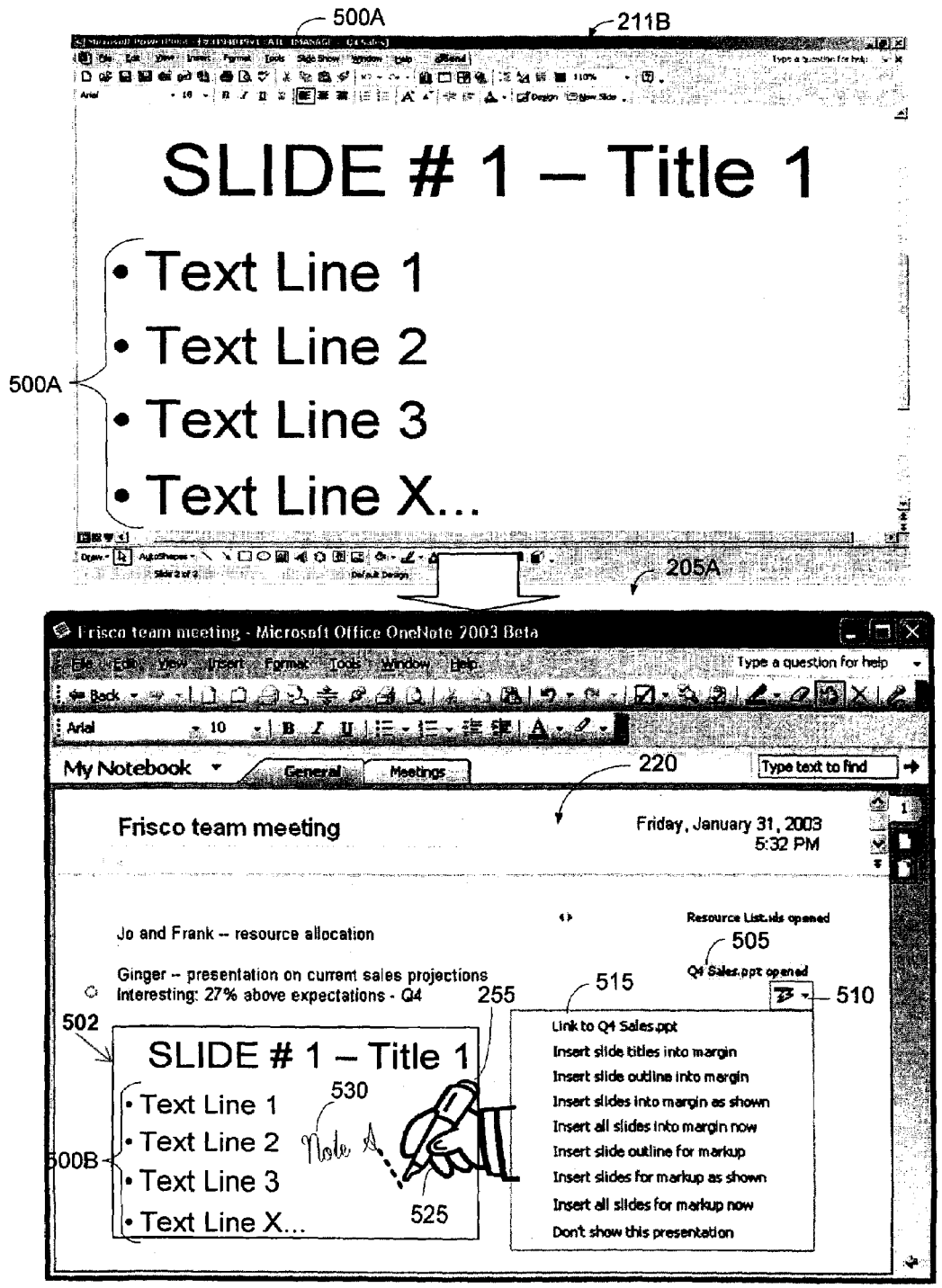
FIG. 5A illustrates duplicated context information formatted as an editable image on an exemplary display screen of a document editing module according to one exemplary embodiment of the present invention.

Referring now to FIG. 5A, this Figure illustrates duplicated context information 500B formatted as an editable image 502 on an exemplary display screen of a document editing module 205A. The document editing module 205A can reside on a first platform 305A relative to originating context information 500A present on an exemplary display screen of a master slide presentation program 211B. The master slide presentation program 211B can reside on a second platform 305B according to one exemplary embodiment of the present invention.

Specifically, the originating context information 500A can comprise a slide of presentation as well as file name for the source of the slide. The master slide presentation program 211B (not shown) can forward the context information to the slave slide presentation program 211A (not shown). The controller 300 (not shown) can detect this context information and forward a copy of it to the document editing module 205A. The document editing module 205A can format the duplicated context information 500B as an editable slide 502 as well as a note 505 comprising the title of the file containing the context information.

A user can activate a menu icon 510 and upon activation of the menu icon 510, the document editing module 205A can display a list 515 of options. A first option can comprise a command to the controller to constantly monitor the activity of the program supporting the file name of the note 505. In other words, the "Link to Q4 Sales.ppt" option will direct the controller to continuously monitor the slave presentation program 211B for changes (which usually includes additions) in context information. Other options in the list 515 can include how the document editing module 205A should display and store the context information.

The other options can include formatting the context information 500B (1) as editable text derived from each slide ("Insert slide outline for markup"); (2) an editable image 502 for each slide ("Insert slides for markup as shown"); (3) a thumbnail image for each slide ("Insert slides into margin now"); (4) a hypertext link to each slide ("Don't show this presentation"); and (5) any combination thereof.

As illustrated in FIG. 5A, the editable slide 502 allows a user to overwrite the slide 502 with additional data such as a handwritten "Note A" 530. Handwritten "Note A" 530 can be generated with a user's hand 525 and a stylus 255. By inserting context information 500B in the format of an editable slide 502, notes that may require more critical thinking may be made by the user more easily. If the context information 500B was not inserted, a user's notes may be less meaningful and possibly more cryptic to a reader other than the user. Also, if the user needed to write-out the context information, he or she would have less time to produce more thoughtful notes for interpreting the context information.

Figure 5B:
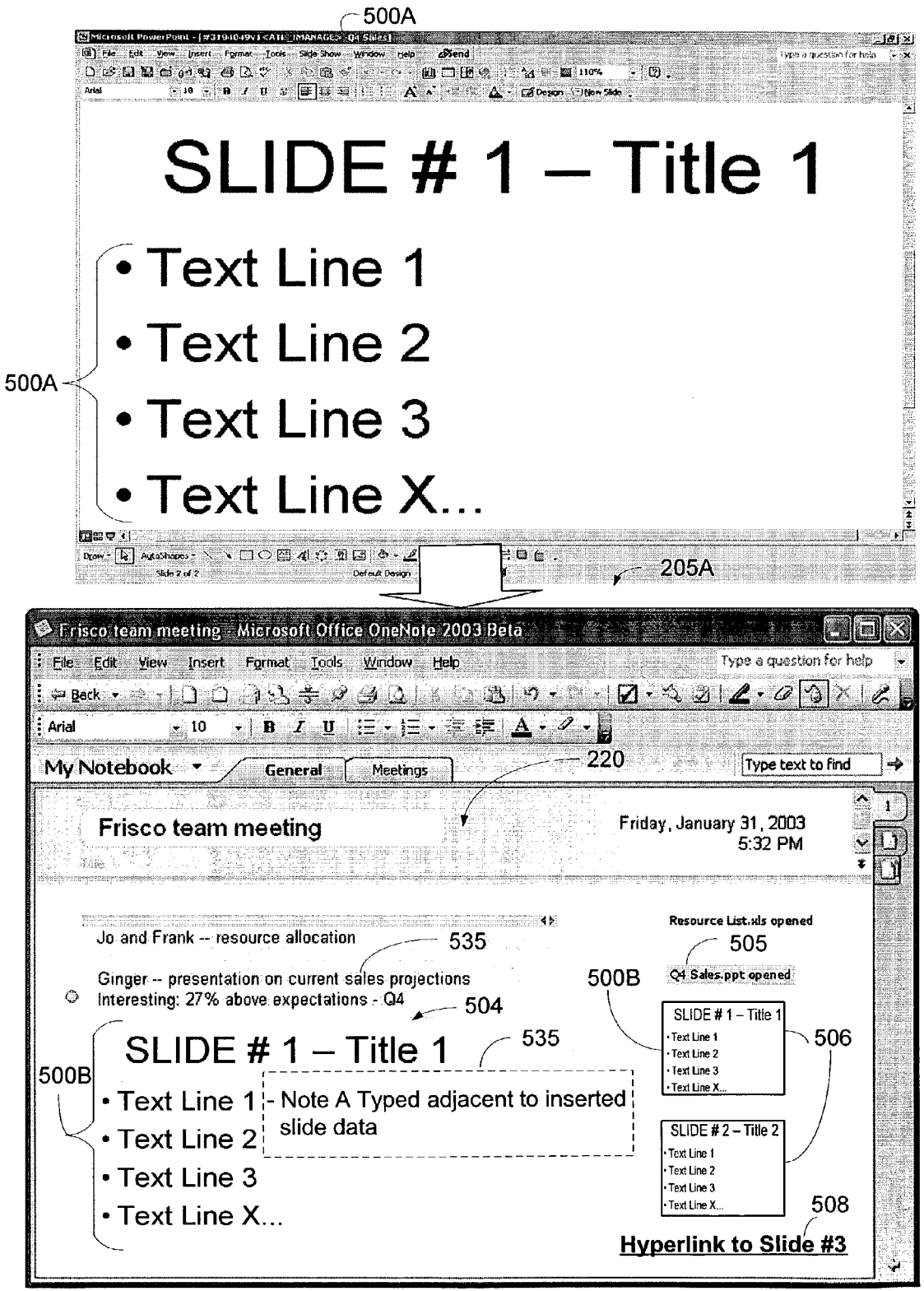
FIG. 5B illustrates duplicated context information formatted as editable text on an exemplary display screen of a document editing module according to another exemplary embodiment of the present invention.

Referring now to FIG. 5B, since this Figure is similar to FIG. 5A, only the differences between these two figures will be discussed below. FIG. 5B illustrates duplicated context information 500B formatted as editable text 504 as well as small images (thumbnails) 506 and hypertext links 508.

The context information 500B can be displayed on an exemplary display screen of a document editing module 205 that resides on a first platform 305A relative to originating context information 500A present on an exemplary display screen of a master slide presentation program 211B. The master slide presentation program 211B can reside on a second platform 305B. Typed text 535 can be inserted adjacent to the editable text 504. And the editable text 504, as its name implies, can be changed or edited by a user.

Figure 5C:
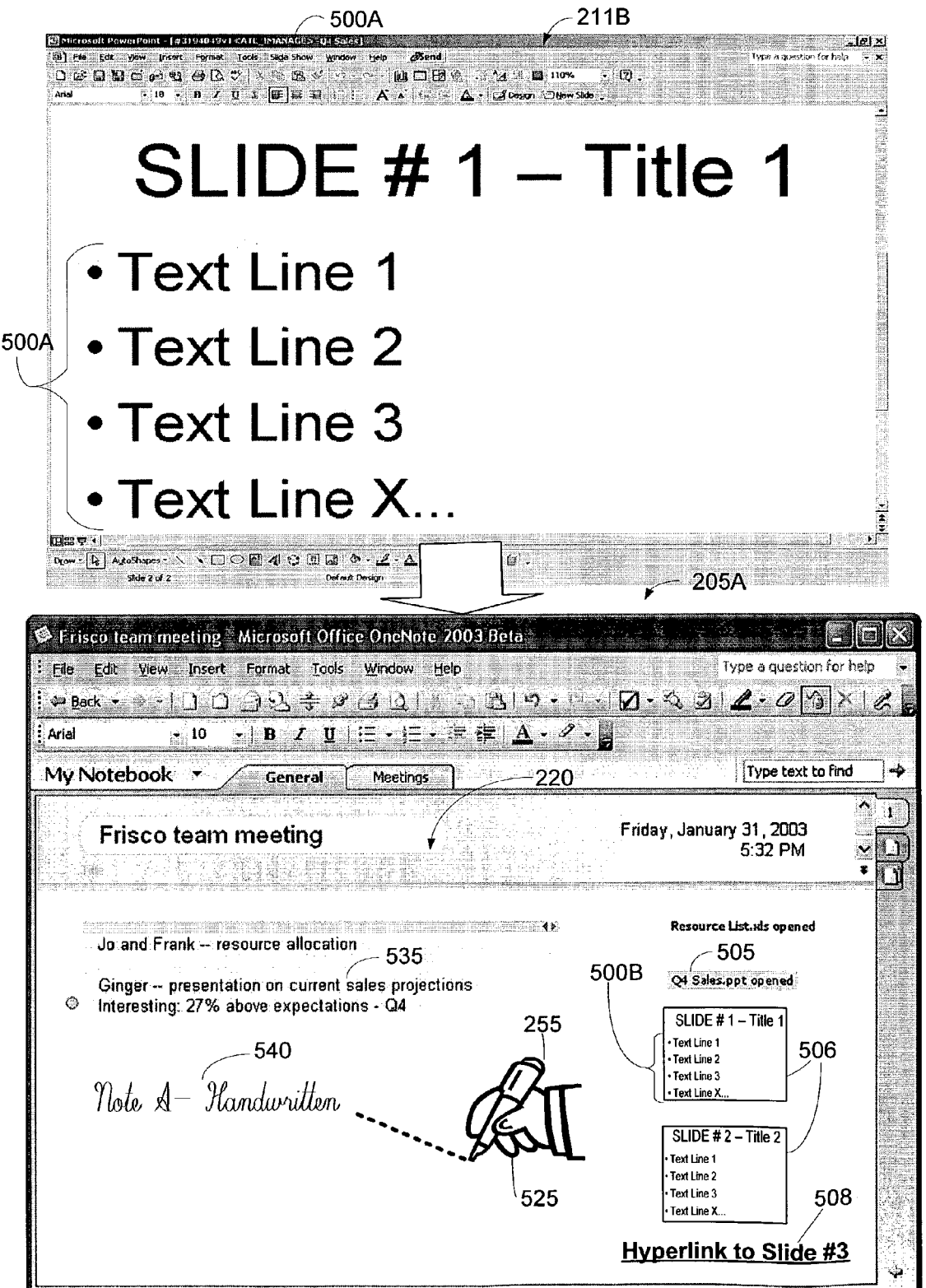
FIG. 5C illustrates duplicated context information formatted as small images (thumbnails) and hypertext links on an exemplary display screen of a document editing module according to another exemplary embodiment of the present invention.

Referring now to FIG. 5C, since this Figure is similar to FIG. 5A, only the differences between these two figures will be discussed below. FIG. 5C illustrates duplicated context information 500B formatted as small images 506 (thumbnails) and hypertext links 508 on an exemplary display screen of a document editing module 205A that resides on a first platform 305A relative to originating context information 500A present on an exemplary display screen of a master slide presentation program 211B. The master slide presentation program 211B can reside on a second platform 305B.

According to this exemplary embodiment illustrated in FIG. 5C, all of the duplicated context information 500B is inserted in the margins of the electronic document 220 supported by the document editing module 205A. Meanwhile, in the main area of the electronic document 220, a user can produce type written notes 535 or handwritten notes 540 with a stylus 255.

Figure 6:
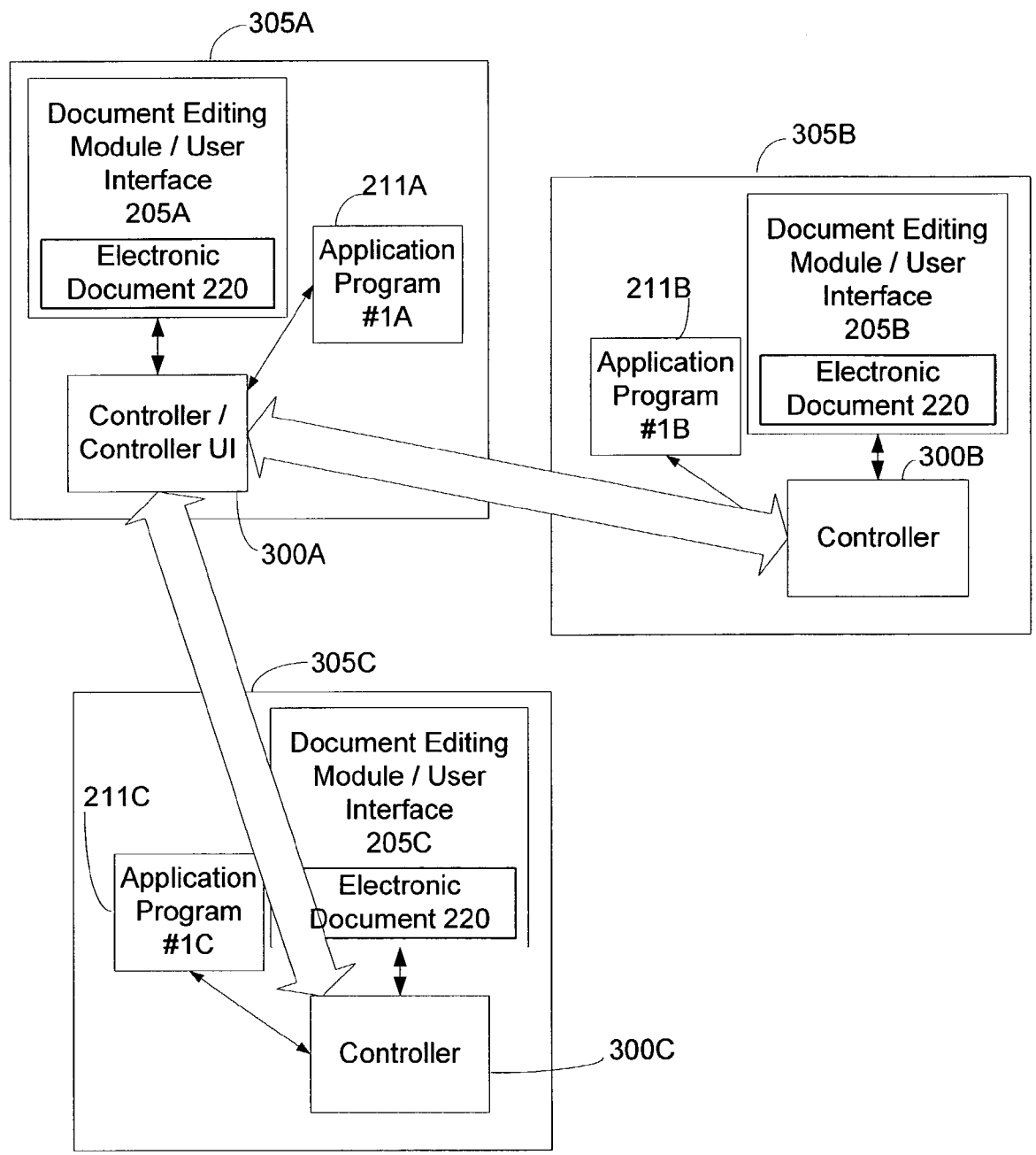
FIG. 6 is a block diagram illustrating a multiple controllers having user interfaces linked together according to one exemplary embodiment of the present invention.

Referring now to FIG. 6, since this Figure is similar to FIG. 4, only the differences between these two figures will be discussed below. FIG. 6 is a block diagram illustrating a multiple controllers 300A, 300B, 300C that support user interfaces which are linked together according to one exemplary embodiment of the present invention. According to this exemplary embodiment, a first controller 300A can communicate context information comprising a meeting agenda to second and third controllers 300B, 300C.

The meeting agenda can be inserted into electronic documents 220 in the form of editable text. The first controller 300A can also monitor attendees of a meeting and can send the second and third controllers 300B, 300C updates as other attendees (having their own controllers 300 not shown) enter and become part of the meeting. Further details of this exemplary embodiment will be discussed below with respect to FIG. 7. Those skilled in the art will appreciate that context information comprising a meeting agenda is but a mere exemplary application for the inventive technology. Other applications are not beyond the scope and spirit of the present invention.

Figure 7:
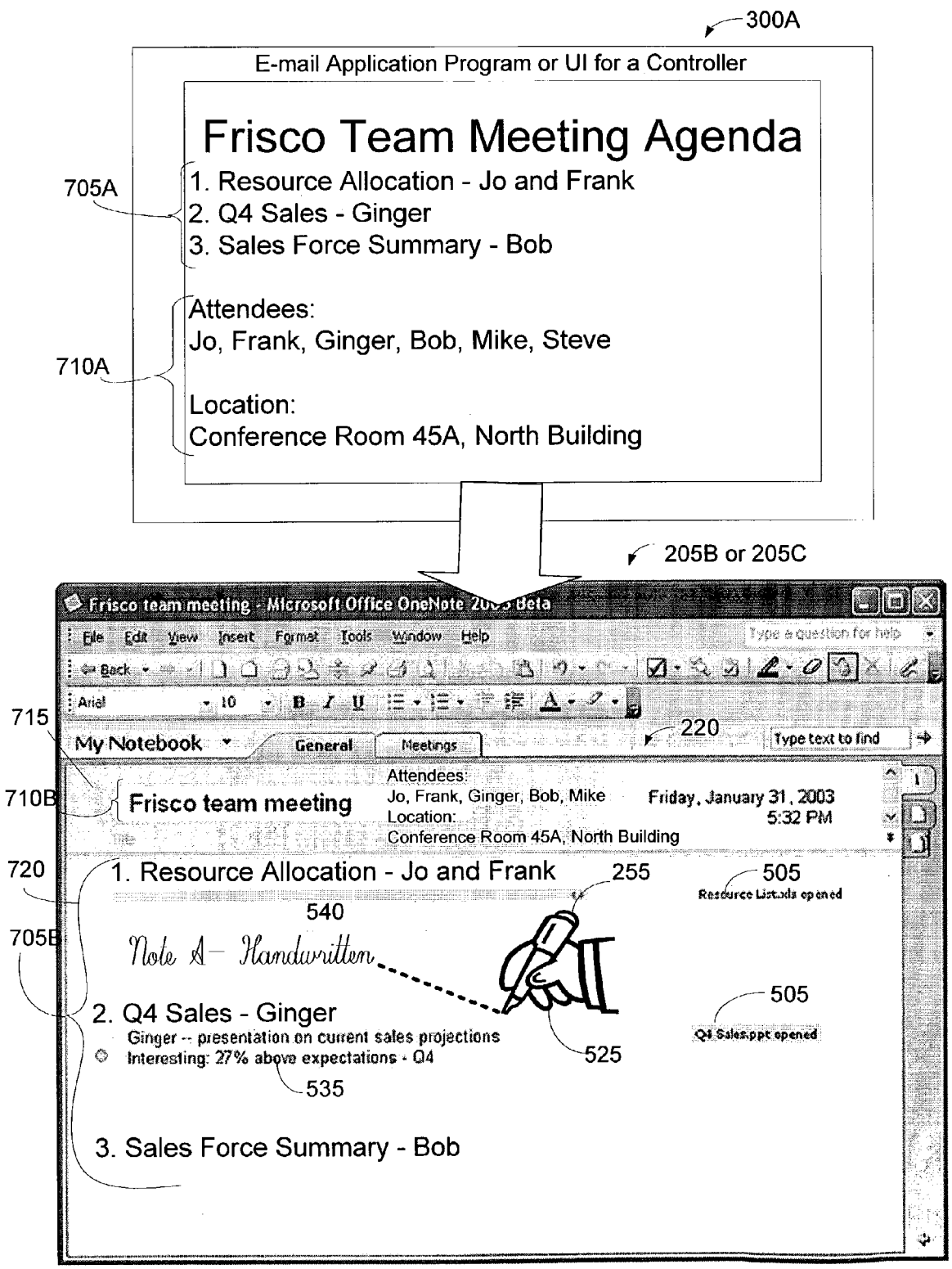
FIG. 7 illustrates context information such as an agenda formatted as editable text and meeting attendees present in page headers on an exemplary display screen of a document editing module according to another exemplary embodiment of the present invention.

Referring now to FIG. 7, this Figure illustrates context information 705B, 710B such as an agenda formatted as editable text and meeting attendees and a location present in page headers on an exemplary display screen of a document editing module 205B or 205C that resides on a first platform 305B or 305C relative to originating context information 705A, 710A. The originating context information 705A, 710A can be present on an exemplary display screen of a controller user interface 300A residing on a second platform 305A.

The first originating context information 705A can comprise a meeting agenda while the second originating context information 710A can comprise an attendee list and location of the meeting. The controller 300A can communicate a copy of this originating context information 705A, 710A to the second and third controllers 300B, 300C. The copy can comprise the duplicate context information 705B, 710B. The second duplicate context information 705B comprising the meeting agenda can be inserted into the electronic document 220 and more specifically, into a body 720 of a page within the electronic document as editable text. Meanwhile, the first duplicate context information 710B comprising the attendees and meeting location can be inserted into a header portion 715 of the electronic document 220. As a new person joins the meeting having a computer with a controller 300, the first controller 300A can update the attendee list and communicate this information to all of the controllers who are on different platforms 305. This updating feature demonstrates one of the strengths of the present invention.

Even after specific context information such as an attendee list is automatically inserted into an electronic document, the attendee list can still be updated as people arrive, in whatever format the user has selected. For example, according to another exemplary format, the attendee list could comprise a table of names and checkmarks. Alternatively, the attendee list could comprise a list of people who were present at the meeting. And further, the attendee list could comprise two lists of people: people who were present at the meeting and people who were not present at the meeting. And lastly, the attendee list could just comprise a number representing the number of people who were present at the meeting. Those skilled in the art recognize that other attendee formats are possible and are not beyond the scope and spirit of the present invention.

Also, with respect to updates, the updating feature could also exist for slides provided to users during a presentation. But usually slide presentations are generally static where the content of the slides do not change. This updating feature could also be used for agenda items as they are updated during a meeting. The updating feature for agenda items could depend on how the agenda items are selected to be inserted into an electronic document—all at once or as agenda items are covered during a meeting or a combination thereof.

Specifically, when a meeting starts, an agenda item can be received and the user can have the option of receiving the agenda items as editable text or marginal text (etc.) for each agenda item as it is covered in a meeting. But a user may also have the option of asking for the whole agenda at once, at the beginning of the meeting. It is for this exemplary scenario when the agenda items are received all at once where each agenda item can be automatically updated with checkmarks for completion or with time stamp information to indicate an amount of time spent on each agenda item.

The controllers 300 can further monitor each other's application programs and have each document editing module 205 update the page of notes illustrated in FIG. 7 as information or an event is covered. For example, the controllers 300 can have respective document editing modules 205 insert hypertext links 505 as information is being covered in a meeting. Specifically, when "Jo and Frank" open their resource allocation spreadsheet during the "Frisco team meeting", a hypertext link 505 comprising the name of the spreadsheet file ("Resource List.xls") containing the resource allocation can be generated. Similarly, when "Ginger" opens her slide presentation during the "Frisco team meeting", a hypertext link 505 comprising the slide presentation file ("Q4 Sales.ppt") containing her slides can also be generated.

Figure 8:
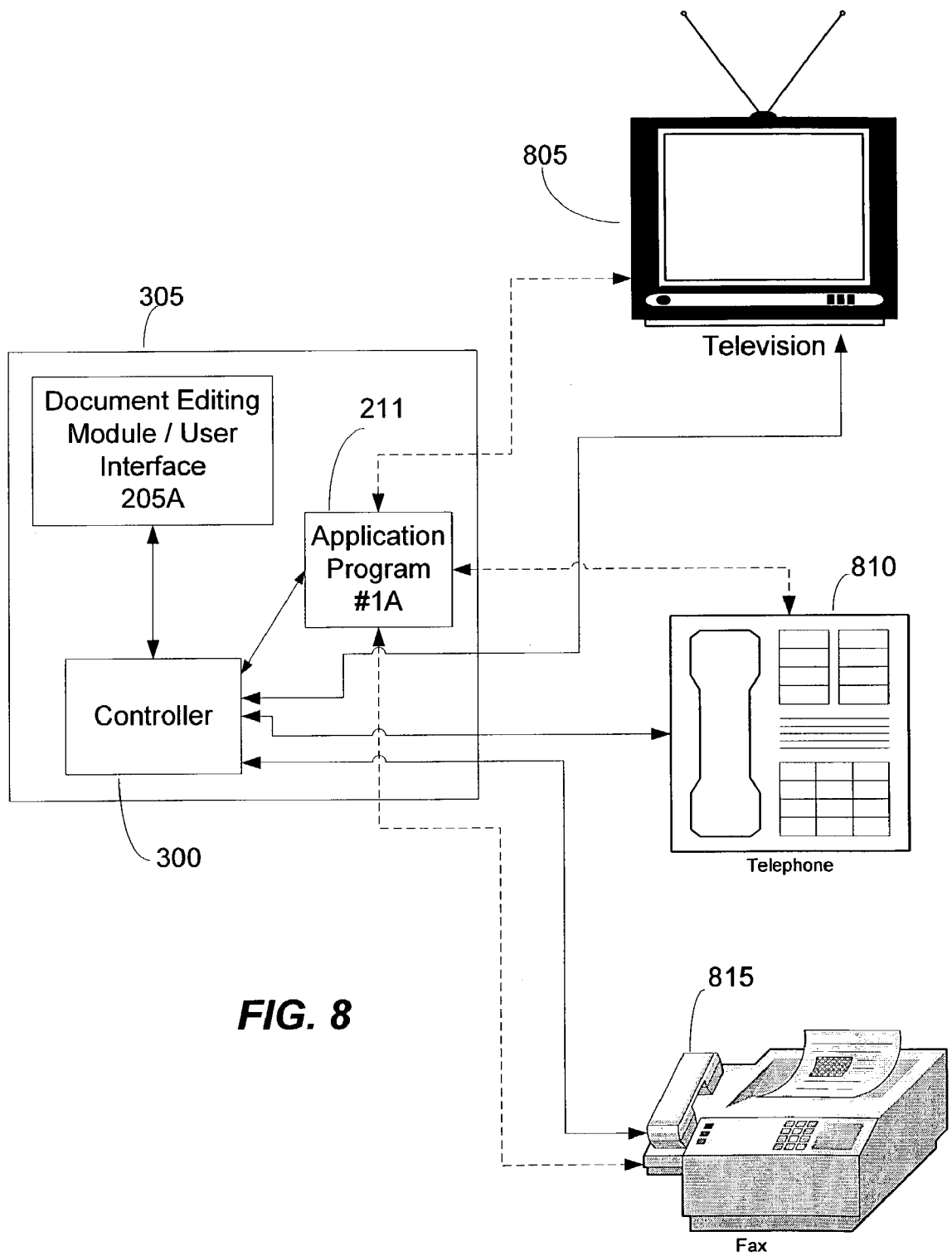
FIG. 8 is a block diagram illustrating a controller operatively linked to external devices or an application program that monitors external devices according to another exemplary embodiment of the present invention.

Referring now to FIG. 8, since this Figure is similar to FIG. 4, only the differences between these two figures will be discussed below. FIG. 4 is a block diagram illustrating a controller 300 operatively linked to external devices 805, 810, 815 or an application program 211 that monitors the external devices 805, 810, 815 according to another exemplary embodiment of the present invention. Specifically, according to one exemplary embodiment, the controller 300 can directly monitor and provide context information relating to a television 805, a telephone 810, and a fax machine 815.

For example, if a user is taking notes with the document editing module 205 and the user receives a phone call, the controller 300 can communicate context information to the document editing module 205. The document editing module 205 can then format this context information and then insert it into the electronic document 220 being manipulated by a user. Further details of this exemplary calling scenario will be discussed below with respect to FIG. 9. The present invention is not limited to the devices illustrated and can operate with other devices that fall within the scope and spirit of the present invention.

According to an alternate exemplary embodiment and as illustrated with dashed lines in FIG. 8, the controller 300 can monitor an application program 211 that may be designed to directly interface with external devices such as the television 805, the telephone 810, and fax machine 815. According to this exemplary embodiment, the controller 300 would not have a direct link with each of the external devices.

Figure 9:
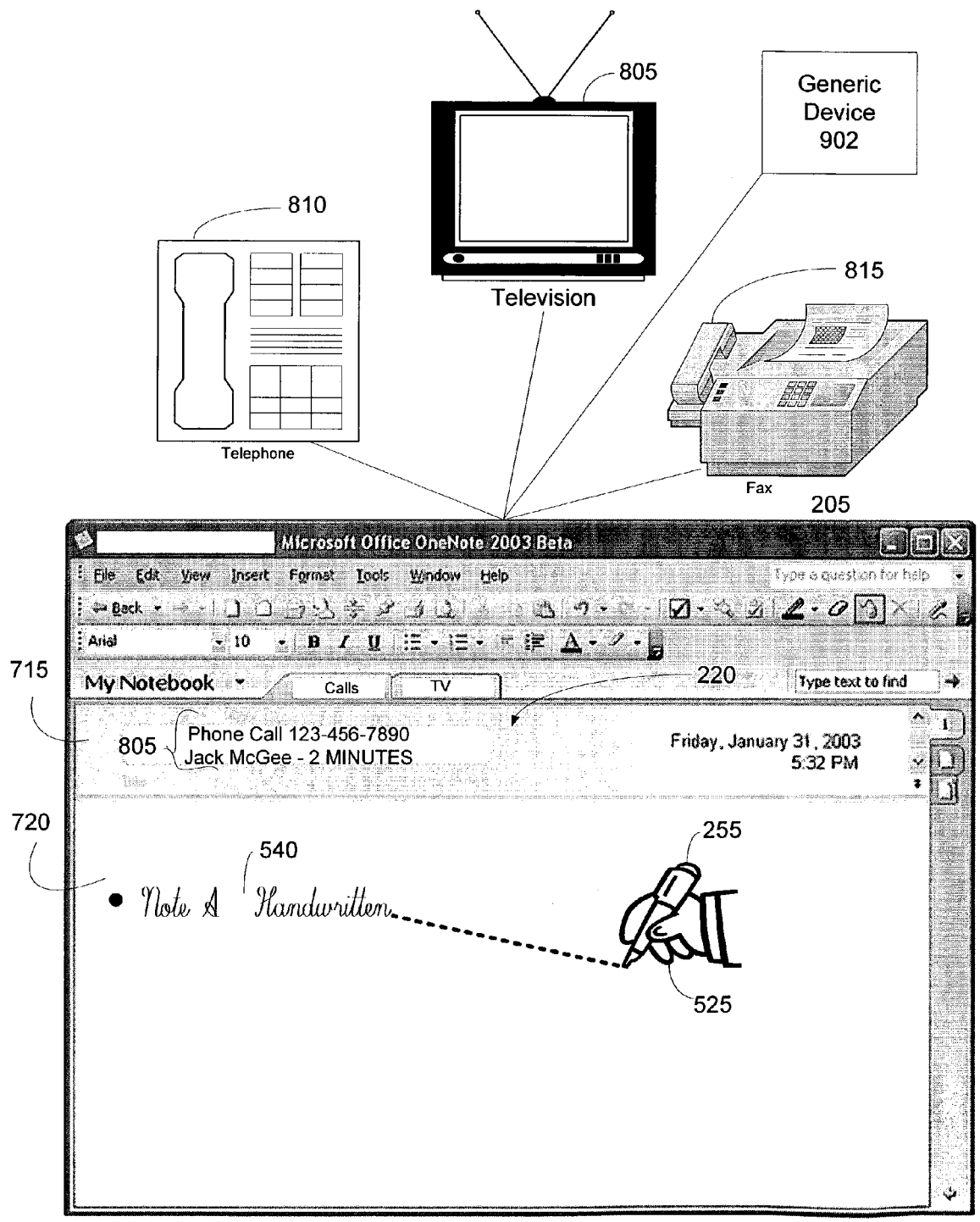
FIG. 9 illustrates context information such as phone call information formatted as header information on an exemplary display screen of a document editing module that is linked to a controller that monitors external devices such as telephones according to another exemplary embodiment of the present invention.

Referring now to FIG. 9, since this Figure is similar to FIG. 8, only the differences between these two figures will be discussed below. FIG. 9 illustrates context information 805 comprising phone call information that can be formatted as header information on an exemplary display screen of a document editing module 205 that is linked to a controller 300 (not shown) that monitors external devices such as a telephone 810 according to another exemplary embodiment of the present invention. The phone call information can comprise the phone number, name of the caller, date, and time of the call. Similarly, while a user is creating notes and watching television or a video taped program, context information comprising the name of the show as well as the date and time can be recorded in the electronic document 220. And similarly, while a user is creating notes and receives a fax, context information comprising the fax originator, the number of pages, the time, and date of the fax can be recorded in the electronic document 220.

A generic device 902 is also illustrated and can be linked to the controller 300. This generic device 902 represents any one of a variety of devices that can generate context information that can be monitored by the controller 300. As a non-limiting example, the generic device 902 can comprise medical equipment. When a doctor is taking notes with his electronic tablet 250 (not shown) in a patient's hospital room, the controller 300 can automatically add context information to document editing module 205 (not shown) from the medical device 902 in the patient's hospital room. In other words, the medical device 902 providing context information could comprise a blood pressure, pulse, or any other type of patient monitors.

In one exemplary embodiment, prior to adding any context information, the controller 300 or document editing module 205 could ask the user if the context information is desired for the note taking session that is open. For example, a user could be prompted with the question: "Insert patient monitoring data for patient Jane Doe?" Alternatively, a context menu could have a default setting of "No Data Inserted", rather than permitting the automatic insertion of context information. For this example, either the controller 300 or document editing program 205 can query the user in some manner in order to determine if context information should be inserted before starting to do so automatically.

As another non-limiting example, the generic device 902 could comprise machines that are typically present in an auto repair shop. In such a scenario, a mechanic could be prompted to allow the automatic insertion of context data that could comprise information generated by a variety of machines such as fluid level detection devices, a timing machine for tune-ups, and any other types of machines that could send context information to the controller 300. Those skilled in the art will appreciate that other external devices that may produce useful context information relative to notes generated by a user are not beyond the scope and spirit of the present invention.

Figure 10:
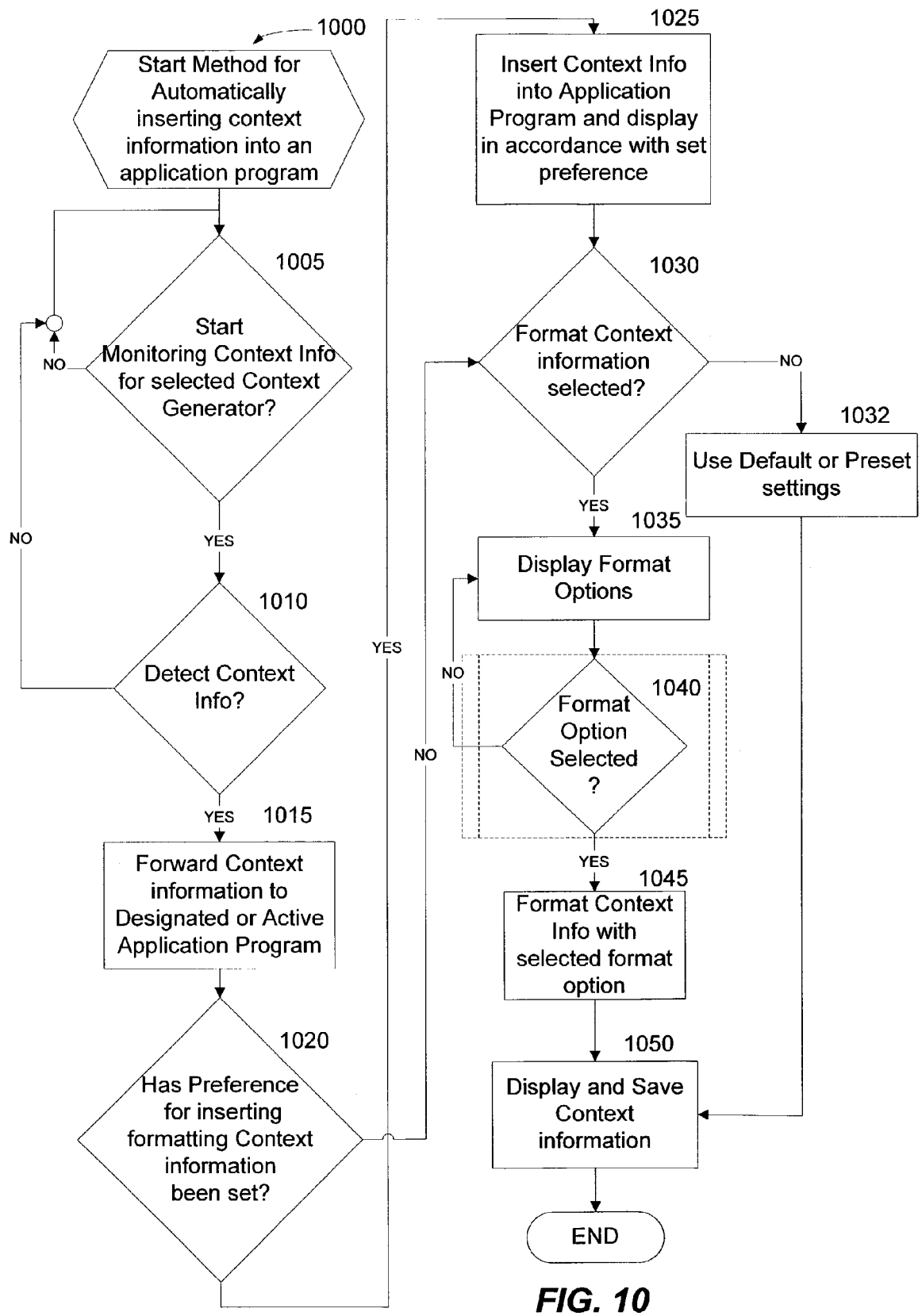
FIG. 10 is a logic flow diagram illustrating an overview of an exemplary process for automatically inserting context information into an application program according to one exemplary embodiment of the present invention.

Exemplary Method for Automatically Inserting Context Information into an Application Program Referring now to FIG. 10, this Figure is a logic flow diagram illustrating an overview of an exemplary process 1000 for automatically inserting context information into an application program 211 according to one exemplary embodiment of the present invention. Certain steps in the processes described below must naturally precede others for the present invention to function as described. However, the present invention is not limited to the order of the steps described if such order or sequence does not alter the functionality of the present invention. That is, it is recognized that some steps may be performed before or after other steps or in parallel with other steps without departing from the scope and spirit of the present invention.

Decision step 1005 is the first step of the exemplary process 1000 in which it is determined whether a context generator has been selected for monitoring or linking to the controller 300. In other words, to start monitoring the activity of an application program 211 or an external device such as a telephone 810, the controller 300 must be instructed or receive a command to start monitoring the activity of the program 211 or telephone 810.

The controller 300 will only insert context information from a program 211 or device when the controller 300 is instructed by a user to start retrieving or monitoring context information from a particular source. In this way, a user can select which programs 211 or devices may be pertinent to a specific note taking session. If the inquiry to decision step 1005 is negative, then the "No" branch is followed back to step 1005. If the inquiry to decision step 1005 is positive, then the "Yes" branch is followed to decision step 1010.

In decision step 1010, the controller 300 determines if new context information has been detected from a source. As noted above, the controller 300 can actively poll or pull information from a context source. Alternatively, the controller 300 can passively receive information pushed on to it from a context source. If the inquiry to decision step 1010 is negative, the "No" branch is followed back decision step 1005. If the inquiry to decision step 1015 is positive, then the "Yes" branch is followed to step 1015.

In step 1015, the detected context information is forwarded to a designated or active application program. For example, the controller 300 can forward the detected context information to the document editing module 205 as selected by the user. Alternatively, the controller 300 can forward the detected context information to any application program selected by the user to receive and format the detected context information.

Next, in decision step 1020, the application program such as the document editing module 205 can determine if preferences have been set by the user for how the detected context information should be formatted. If the inquiry to decision step 1020 is negative, then the "No" branch is followed to decision step 1030. If the inquiry to decision step 1020 is positive, then the "Yes" branch is followed to step 1025 in which the detected context information is inserted into the application program 205 and displayed in accordance with the set preference.

Next, in decision step 1030, it is determined if the icon 510 for changing the format of the context information has been selected. If the inquiry to decision step 510 is negative the "No" branch is followed to step 1032 in which default or the set preferences are used. From step 1032, the process proceeds to step 1050 as will be discussed below.

If the inquiry to decision step 1030 is positive, then the "Yes" branch is followed to step 1035 in which the format options in the form of a drop down list 515 can be displayed. Next in routine 1040, the active application program or document editing module 205 determines which option has been selected. Further details of routine 1040 will be discussed below with respect to FIG. 11. If the inquiry to routine 1040 is negative, then the "No" branch is followed back to step 1035. If the inquiry to decision step 1040 is positive, then the "Yes" branch is followed to step 1045.

In step 1045, the context information is formatted with the selected option. And in step 1050 the formatted context information is displayed and saved. The process then ends.

Figure 11:
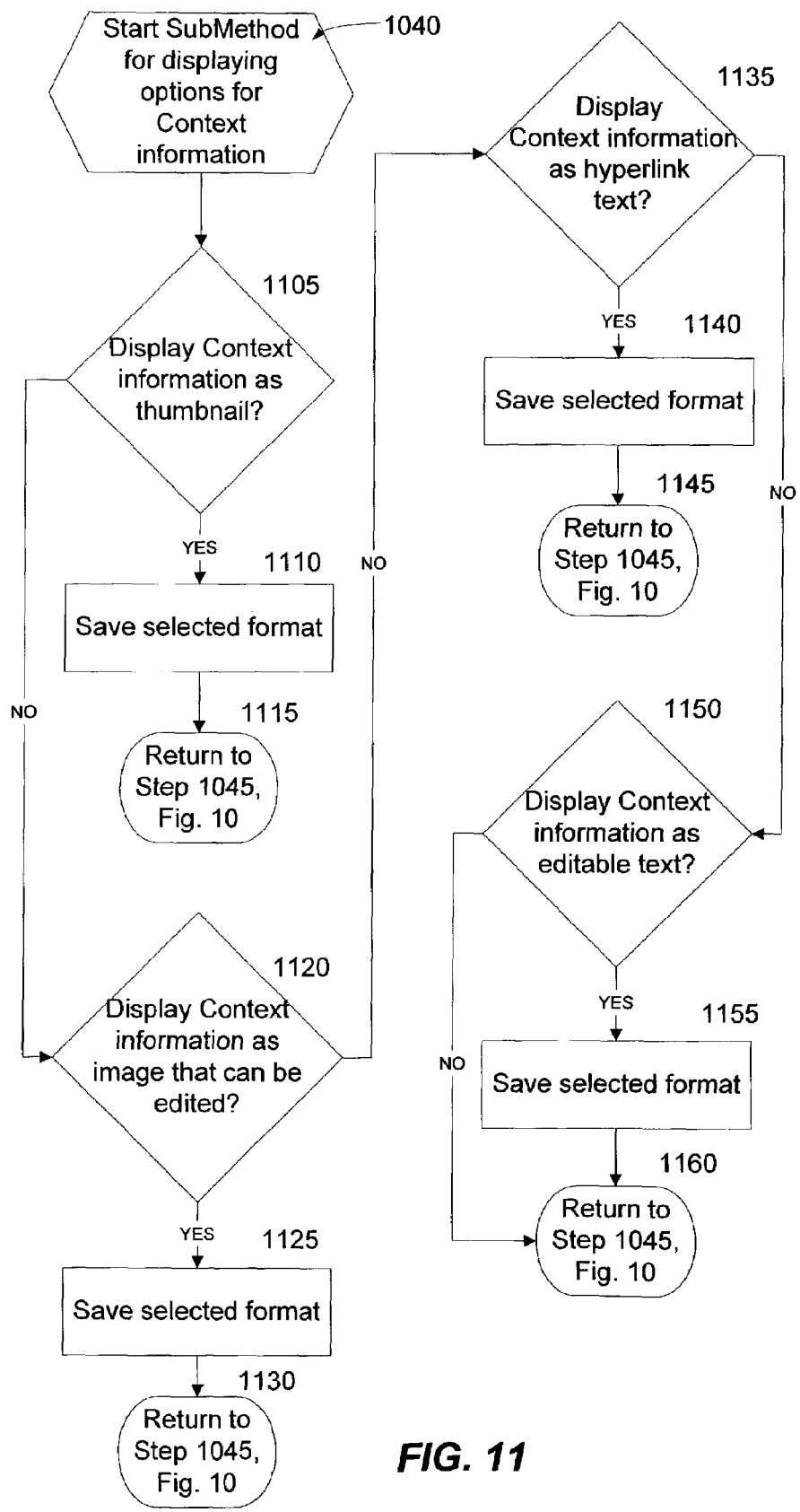
FIG. 11 is a logic flow diagram illustrating a submethod of FIG. 10 for determining display options for event information according to one exemplary embodiment of the present invention.

Referring now to FIG. 11, this Figure is a logic flow diagram illustrating a submethod 1040 of FIG. 10 for determining display options for context information according to one exemplary embodiment of the present invention. While only four display options are discussed below, one of ordinary skill in the art recognizes that a fewer number or a greater number of display options are certainly not beyond the scope and spirit of the present invention.

Decision step 1105 is the first step in submethod 1040 in which the application program 211 or document editing module 205 determines if the display context information as a thumbnail has been selected. If the inquiry to decision step 1105 is positive, then the "Yes" branch is followed to step 1110 in which the selected format is saved. Next in step 1115, the submethod returns to step 1045 of FIG. 10.

If the inquiry to decision step 1105 is negative, then the "No" branch is followed to decision step 1120. In decision step 1120, the application program 211 or document editing module 205 determines if the display context information as an image that can be edited has been selected. If the inquiry to decision step 1120 is positive, then the "Yes" branch is followed to step 1125 in which the selected format is saved. Next in step 1130, the submethod returns to step 1045 of FIG. 10.

If the inquiry to decision step 1120 is negative, then the "No" branch is followed to decision step 1135. In decision step 1135, the application program 211 or document editing module 205 determines if the display context information as hyperlink text has been selected. If the inquiry to decision step 1135 is positive, then the "Yes" branch is followed to step 1140 in which the selected format is saved. Next in step 1145, the submethod returns to step 1045 of FIG. 10.

If the inquiry to decision step 1135 is negative, then the "No" branch is followed to decision step 1150. In decision step 1150, the application program 211 or document editing module 205 determines if the display context information as text that can be edited has been selected. If the inquiry to decision step 1150 is positive, then the "Yes" branch is followed to step 1155 in which the selected format is saved. Next in step 1160, the submethod returns to step 1045 of FIG. 10. If the inquiry to decision step 1150 is negative, then the "No" branch is followed to step 1160.

CONCLUSION

With the present invention, context information can be automatically inserted into an application program such that an author can concentrate on preserving information that requires more critical thinking and that cannot be accurately recorded by a machine. The method and system of the present invention inserts context information into an application program and permits the context information to be formatted or presented in a variety of ways.

It should be understood that the foregoing relates only to illustrative embodiments of the present invention, and that numerous changes may be made therein without departing from the spirit and scope of the invention as defined by the following claims.

What is claimed is:

1. A method in a computing device for automatically inserting context information into a document being edited by a user, the method comprising:
   opening the document to be edited by the user using an editing module;
   receiving from the user a selection of an application program to monitor, the application program having associated data;
   receiving from the user a selection of options for controlling insertion of data of the monitored application program into the document being edited;
   after the monitoring of the application program indicates a change in data, receiving the changed data from the application program; and inserting the changed data into the document being edited;
   after inserting the changed data, editing the document including the inserted data based on instructions of the user; and
   closing the document with the inserted data and with the user edits so that the document comprising user edits with data of the application program as context information.

2. The method of claim 1 including displaying of options for controlling insertion of data and receiving from the user a selected of one of the displayed options.

3. The method of claim 1 wherein the monitored application program executes on a television, a telephone, a fax machine, or a medical device that provides the data to the monitored application program.

4. The method of claim 1 wherein an option specifies where to insert the data into the document.

5. The method of claim 1 wherein an option specifies when to retrieve the data of the application program.

6. The method of claim 1 including determining whether the inserted data should be displayed as a thumbnail-sized image.

7. The method of claim 1 including not allowing the editing of the certain inserted data.

8. The method of claim 1 including determining whether the inserted data should be displayed as a hyperlink.

9. A computing device for automatically inserting context information into a document being edited by a user using a handwriting tablet, comprising:
   a component that receives from the user a selection of a currently executing application program to monitor for context information, the application program having associated data that is displayed via a user interface;
   a component that receives from the user a selection of options for controlling insertion of data of the monitored application program into the document being edited via an editing module;
   a component that monitors the application program in accordance with a selected option to receive data from the application program;
   a component that inserts the received data into the document being edited; and
   a component that allows a user to enter handwritten commands via the tablet to edit the document including the inserted data.

10. The computing device of claim 9 wherein the component that receives a selection of options displays options for controlling insertion of data.

11. The computing device of claim 9 wherein the application program is selected from a group consisting of a slide presentation program, a web browsing program, a spreadsheet program, a word processing program, an electronic mail program, a scheduling program, and a calendar program.

12. The computing device of claim 9 wherein an option specifies where to insert the data into the document.

13. The computing device of claim 9 wherein an option specifies when to retrieve the data of the application program.

14. The computing device of claim 9 wherein the component that monitors is separate from the editing module.

* * * * *